United States Patent [19]

Dean

[11] 4,020,274

[45] Apr. 26, 1977

[54] SUPERCONDUCTING CABLE COOLING SYSTEM BY HELIUM GAS AND A MIXTURE OF GAS AND LIQUID HELIUM

[75] Inventor: John W. Dean, Los Alamos, N. Mex.

[73] Assignee: The United States of America as represented by the United States Energy Research and Development Administration, Washington, D.C.

[22] Filed: Jan. 27, 1976

[21] Appl. No.: 649,887

[52] U.S. Cl. .................................... 174/15 S
[51] Int. Cl.$^2$ ............................... H01B 12/00
[58] Field of Search ........... 174/15 C, 15 CA, 15 S, 174/126 R, 128 S, 130, 126

[56] References Cited

UNITED STATES PATENTS

| | | | |
|---|---|---|---|
| 3,162,716 | 12/1964 | Silver | 174/15 S |
| 3,292,016 | 12/1966 | Kafka | 174/15 S X |
| 3,463,869 | 8/1969 | Cooley et al. | 174/15 S |
| 3,512,581 | 5/1970 | Lawton | 174/15 S X |
| 3,634,597 | 1/1972 | Ziemek et al. | 174/15 S |
| 3,638,154 | 1/1972 | Sampson et al. | 174/126 S X |
| 3,697,665 | 10/1972 | Doose et al. | 174/15 S |
| 3,720,777 | 3/1973 | Sampson et al. | 174/15 S |
| 3,749,811 | 7/1973 | Bogner et al. | 174/15 S |
| 3,800,062 | 3/1974 | Kataoka et al. | 174/15 S |
| 3,808,351 | 4/1974 | Moisson-Franckhauser et al. | 174/15 S |
| 3,864,508 | 2/1975 | Beck | 174/15 S |
| 3,902,000 | 8/1975 | Forsyth et al. | 174/15 CA X |
| 3,917,897 | 11/1975 | Hildebrant | 174/15 S |
| 3,946,141 | 3/1976 | Schmidt | 174/15 S X |
| 3,950,606 | 4/1976 | Schmidt | 174/15 S |

OTHER PUBLICATIONS

H. M. Long, *Design Features of AC Superconducting Cables*, Journal of Applied Physics, vol. 42, No. 1, Jan. 71, pp. 155–162.

Primary Examiner—Arthur T. Grimley
Attorney, Agent, or Firm—Dean E. Carlson; Leonard Belkin; Cornell D. Cornish

[57] ABSTRACT

Thermally contacting, oppositely streaming cryogenic fluid streams in the same enclosure in a closed cycle that changes from a cool high pressure helium gas to a cooler reduced pressure helium fluid comprised of a mixture of gas and boiling liquid so as to be near the same temperature but at different pressures respectively in go and return legs that are in thermal contact with each other and in thermal contact with a longitudinally extending superconducting transmission line enclosed in the same cable enclosure that insulates the line from the ambient at a temperature $T_1$. By first circulating the fluid in a go leg from a refrigerator at one end of the line as a high pressure helium gas near the normal boiling temperature of helium; then circulating the gas through an expander at the other end of the line where the gas becomes a mixture of reduced pressure gas and boiling liquid at its boiling temperature; then by circulating the mixture in a return leg that is separated from but in thermal contact with the gas in the go leg and in the same enclosure therewith; and finally returning the resulting low pressure gas to the refrigerator for compression into a high pressure gas at $T_2$ is a closed cycle, where $T_1 > T_2$, the temperature distribution is such that the line temperature is nearly constant along its length from the refrigerator to the expander due to the boiling of the liquid in the mixture. A heat exchanger between the go and return lines removes the gas from the liquid in the return leg while cooling the go leg.

10 Claims, 3 Drawing Figures

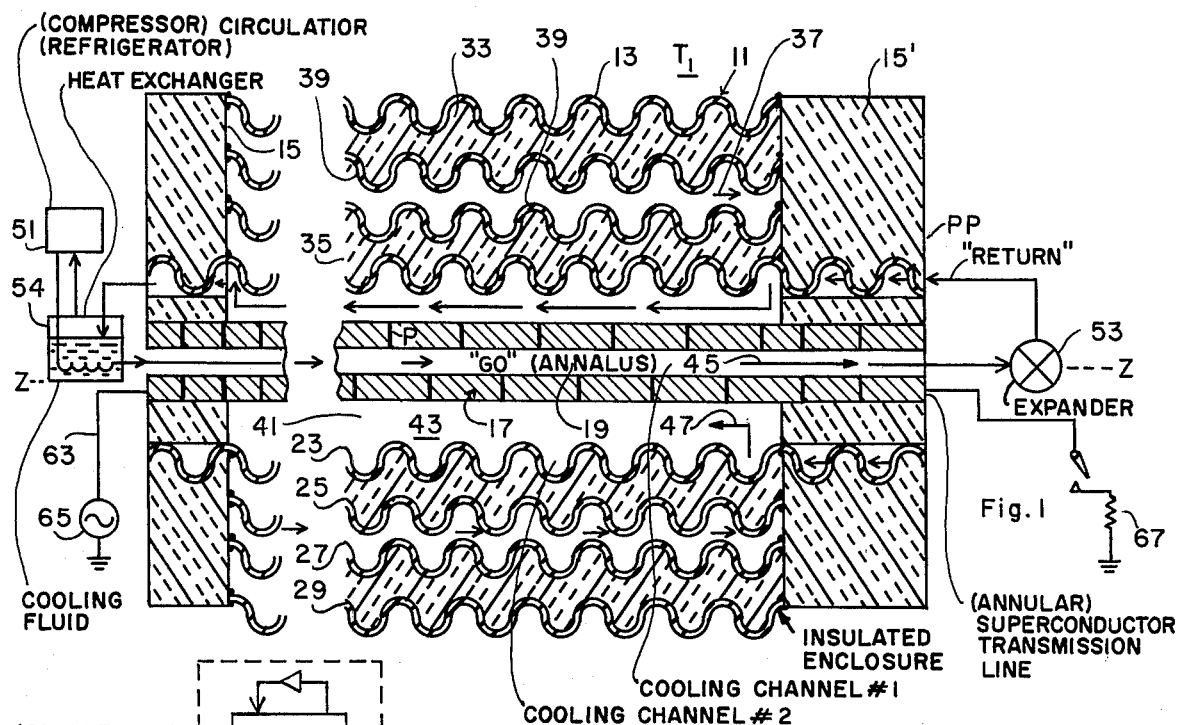
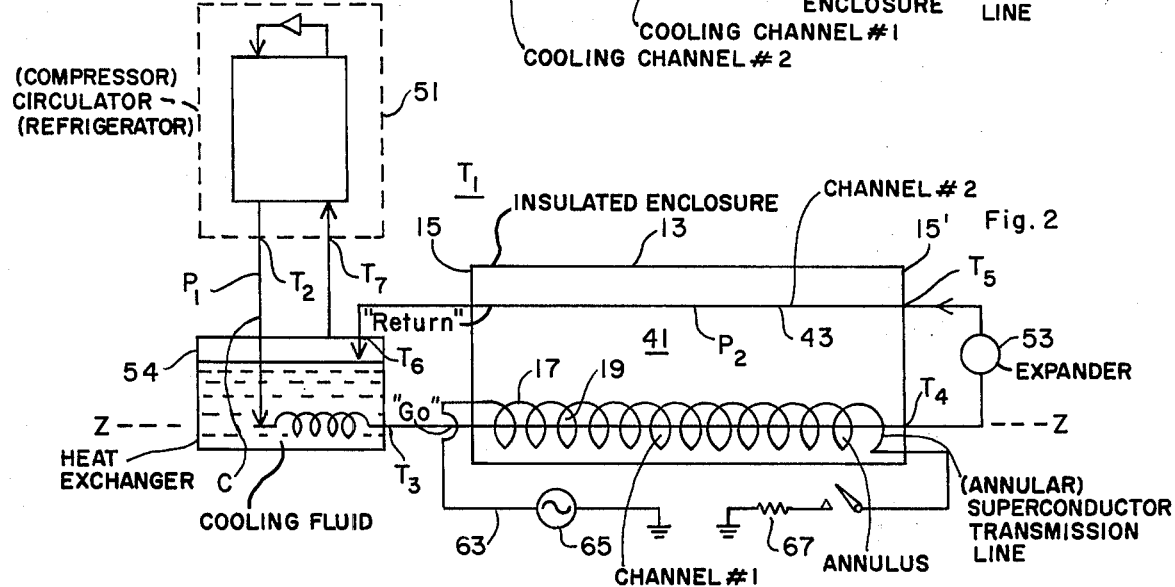
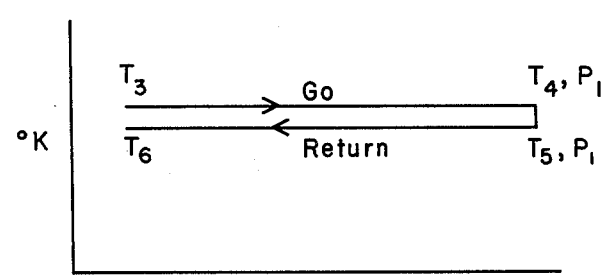

SUPERCONDUCTING CABLE COOLING SYSTEM BY HELIUM GAS AND A MIXTURE OF GAS AND LIQUID HELIUM

STATEMENT OF GOVERNMENT INTEREST

This invention was made in the course of, or under a contract with the United States Energy Research and Development Administration, or its predecessor, the United States Atomic Energy Commission.

Cross-Reference to Related Applications

Ser. No. 523,182, filed: Nov. 12, 1974 (Now U.S. Pat. No. 3,902,000) by Forsyth et al., "Termination for Superconducting Power Transmission Systems;" and Ser. No. 649,888, Filed; January 27, 1976, by John W. Dean on "Superconducting Cable Cooling System by Helium Gas at Two Pressures"

BACKGROUND OF THE INVENTION

In the field of superconducting transmission lines, the transmission line cable and cable containment envelope or enclosure terminate at each end of the line so that the cryogenic cooling fluid for maintaining the line below its superconducting critical temperature can enter at one end of the cable enclosure and exit from the other end thereof. Referring to FIG. 1a of the above cited Forsyth et al. U.S. Pat. 3,902,000, which is incorporated by reference herein, 7°K cooling fluid enters at one end, exits at the other end and returns to the refrigerator in a separate enclosure.

SUMMARY OF THE INVENTION

This invention provides cryogenic cooling apparatus having separated, but thermally contacting, counter-streaming gas and boiling liquid coolant streams at different pressures and nearly the same constant temperature in the same enclosure for use with a superconducting transmission line having an insulating enclosure with opposite terminals at ambient temperature, comprising a cryogenic cooling fluid, a superconducting transmission line forming a first channel for circulating the cryogenic cooling fluid as a high pressure gas at a first substantially constant temperature and at a first substantially constant pressure in a first go direction, enclosure means encircling the transmission line and forming a second channel in thermal contact with the first channel and the transmission line for circulating the cryogenic cooling fluid as a boiling liquid-gas mixture at a second substantially constant temperature and at a second low substantially constant pressure in a second return direction opposite to the first go direction, first means for circulating the cryogenic fluid as a gas in the first channel in the enclosure means at said first substantially constant temperature and first high pressure, second means for circulating the fluid as a boiling-gas mixture in the second channel at a second reduced pressure and at a substantially constant second temperature in the same enclosure to provide oppositely streaming cryogenic fluid streams in the same enclosure in a closed cycle at said different pressures respectively, and means forming a liquid-vapor separator and heat-exchanger between the counterstreaming go and return lines located between the transmission line and the first means for cooling the gas before it enters the first channel to at least about 4.5 K at the first high pressure thereof. With the proper selection of fluids, apparatus and steps, as discussed in more detail hereinafter, the desired superconducting transmission line cable and cooling system therefor are provided.

OBJECTS OF THE INVENTION

It is an object of this invention, therefore, to provide improved cryogenic cooling apparatus and method for a superconducting transmission line at about 4.5 K or less by providing thermally contacting, but separated and oppositely streaming cryogenic fluid streams at different pressures in a closed cycle;

Another object is to counterstream a cryogenic cooling fluid in the same enclosure in a closed cycle in liquid and gaseous states in thermal contact with each other and a superconducting cable so that the liquid circulates in the cable at a substantially constant temperature;

Another object is to circulate cryogenic cooling fluid in the same enclosure in a closed cycle through a superconducting transmission line having a refrigerator and an expander at the opposite ends of the transmission line.

BRIEF DESCRIPTION OF THE DRAWINGS

In the drawings, where like elements are referenced alike:

FIG. 1 is a partial cross-section of one embodiment of the superconducting transmission line of this invention;

FIG. 2 is a partial schematic view of the transmission line of FIG. 1 having an expander at one end and a refrigerator at the other end.

FIG. 3 is a graphic illustration of the temperature and pressure of the cryogenic cooling fluid versus distance along the transmission line of FIG. 2.

DESCRIPTION OF THE PREFERRED EMBODIMENT

This invention is useful for cooling superconducting cables for power line transmission to low operating temperatures. For example, this invention is useful for cooling an Nb or a NbTi superconducting cable to about 4.5 K or less for supplying power to the Brookhaven National Laboratory.

Referring to FIG. 1, a superconducting transmission line 11 is shown in FIG. 1 and described in U.S. Pat. No. 3,720,777, and U.S. Pat. No. 3,902,000 which are incorporated by reference herein. This transmission line comprises an insulating enclosure 13, terminals 15 and 15' at ambient temperature, and spaced apart, insulated, parallel, fluxjump stabilized, multilayer ribbons or braided, composite-structure, flexible superconducting means 17 that are annularly wound to form a cooling channel 19, the materials and fabrication techniques therefor being disclosed by U.S. Pat. Nos. 3,638,154; and 3,432,783 and/or 3,423,706, which are also incorporated by reference herein. Transmission of electrical power in this type of transmission line through these superconducting means is based on the fact that the line loses all electrical resistance when it is cooled to a temperature below its critical superconducting temperature.

One way of cooling a transmission line 11 employing an annular Nb or NbTi superconductor means 17 to a temperature below the critical superconducting temperature thereof, is to circulate a coolant as a pressurized gas through a central, cylindrical, longitudinally extending, enclosed cooling channel 19 formed on the inside of the superconducting means e.g., by helical windings having gas tight insulation P therebetween, along a path between the two opposite end terminals 15 and 15' at the center of a cryostat-type insulating enclosure 13 located on the z—z axis of the transmission line 11 so that the liquid cools the various superconductors in the go direction. In the practical arrangement shown in FIG. 1 the cable cryostat-type insulating enclosure 13 is an annular dewar manufactured by Kabel metal, in which nested, concentric inner and outer tubes e.g., bellows 23, 25, 27 and 29 that spiral around the z—z axis to provide continuous gas paths PP, as in FIG. 1, are provided with conventional multi-layer and/or vacuum thermal insulation 33 and 35 separating the inner and outer tubes from the adjacent tubes. Advantageously, liquid nitrogen 37 flows in the annulus 39 between the insulated tubes to form a thermal radiation shield, and some such shield is critical for this application. It is shown here for ease of explanation in one embodiment of the invention hereinafter described, which utilizes a superconducting transmission line 11 of type described in which the annular space 41 between the outside of the cylindrical superconducting means 17 and the inside of the annular enclosure 13 is subjected to a counter-circulating, boiling, low pressure, gas-liquid cryogenic mix 43 at a substantially constant low temperature in thermal contact with the superconducting means 17, central cooling channel 19, and the high pressure gaseous coolant c in the central cooling channel 19 in a manner described below in connection with particular configurations of these elements for forming nearly constant temperature "go" and "return" direction legs 45 and 47 that are in thermal contact with each other and the superconducting means 17, so that the gaseous coolant circulating in the coolant channel 19, which forms the constant temperature "go" leg, leaves the transmission line cable at nearly the same temperature as its input, and the temperature distribution of the boiling fluid in the return leg is such that the transmission line temperature is nearly constant along its length. A mathematical treatment of the principles involved in this invention, which are understood in the art from the description herein, is understood from this invention when read in connection with the copending application filed herewith, which is incorporated by reference herein.

In order to explain how the method and apparatus of this invention accomplish the function of maintaining nearly constant temperatures in the transmission line 11 in the "go" and "return" directions, reference is made to FIG. 2, wherein is illustrated a refrigerator compressor 51 that dumps heat to the ambient at temperature $T_{,1}$ and an expander 53 disposed at opposite ends of the transmission line, and a combined liquid-vapor separator and heat exchanger 54 between the "go" and return legs adjacent the refrigerator for transporting the fluid from the "return" leg into a liquid to cool the "go" line and to return the gas in a closed cycle to the refrigerator. This separator receives low pressure gas and liquid from the "return" line where they remain at a constant low equilibrium temperature. This constant low temperature boiling fluid, which is in thermal contact with the high pressure gas in the "go" line, maintains this high pressure gas, in the "go" line nearly at the same temperature as in the "return" line. Meanwhile, the liquid and gas from the "return" line, which is at low pressure, is separated in the exchanger 54, where the high pressure gas in the go line is cooled to about 4.5 K or less, and the low pressure gas from the return line is returned to the refrigerator-compressor for recirculation to the go line at about 6 K. The gas in the go leg is at about 4.5 K or less, so that the transmission line transmits electrical power without resistance below its critical current and critical temperature between the opposite terminals by suitably connecting the transmission line in a circuit 63 having a power source 65 and a load 67. The high pressure gas c at pressure $P_1$ from the refrigerator in the go leg is at temperature $T_2$, $T_3$ and $T_4$ when it comes out of the refrigerator, heat exchanger and transmission line respectively, and the gas and liquid 43 are at temperatures $T_5$, $T_6$ and $T_7$ where they enter the return leg, the heat exchanger and the refrigerator respectively.

Should the high pressure gas from the go leg at temperature $T_4$ be expanded by an expander 53, this gas changes to a boiling liquid-gas mixture 43 at a low pressure $P_2$. Thereupon, the liquid-gas mixture circulates back through annulus 41 at a nearly constant pressure and temperature and exits to the heat exchanger 54 at temperature $T_6$, which is approximately equal to the input temperature $T_5$, since the go and return legs are in thermal contact, as shown in FIGS. 1–3. Thereupon, the liquid from the liquid-gas mixture cools the go leg in the heat exchanger 54 so that the high pressure gas is at least as cold as 4.5 K. Meanwhile, the gas separated from the liquid-gas mixture in the return leg is cooled and compressed in refrigerator 51 to a high pressure low temperature gas for recirculation into the go leg at $T_2$, where $T_1>T_2>T_4>T_3>T_5$ and $T_5 \approx T_6$ and $T_7$.

In operation, the annularly wound superconductor means 17 forms a gas tight partition between the low and high pressure coolants. Fig. 3, which illustrates a typical operation, involves conventional valves, expansion engines, refrigerators, compressors and heat exchangers. For example, the expander may be an expansion valve, which is inefficient, a piston engine, or a turbine, which is the most efficient, all of which are commercially available. The latter two may be used with a conventional screw compressor to provide sufficient work to increase the flow of the low pressure fluid through the annular space 41 by suction or increased head if desired.

Advantageously, in one example the high pressure gas c in the go leg is 4.5 K helium at 15–20 atm. and the liquid-gas mixture in the return direction is at 1 atm. and <4.5 K so as to maintain the Nb or NbTi superconductor transmission line 11 below its critical superconducting temperature. The use of a return leg that has a larger cross-sectional area than the input in the go direction is to reduce friction. This is convenient, since the return surrounds the input in the go direction.

In one example, the performance is as follows: The temperature of the coolant gas c leaving the refrigerator is at 6 K and 15 atm, at $T_2$, leaving the heat exchanger is at 4.5 K and 15 atm at $T_3$, and is at 4.8 K and 12 atm at $T_4$ leaving the go leg. The boiling liquid gas mixture in the return leg is at 4.2 K and ~ 1 atm at $T_5$ before entering the transmission line at terminal end 15', is at 4.2 K and ~ 1 atm at $T_6$ before entering the heat exchanger 54, and at 4.2 K and ~ 1 atm at $T_7$ before entering the refrigerator compressor for recirculation into the go leg.

The thermal influx occurs across a transmission line that is 35 mm in diameter having a length of at least 20 m in this one example. In this example, the inside diameter of the insulating enclosure is 76mm. When the total surface area of the corrugated tube of 0.39 m²/m is considered, the thermal influx is 0.25 W/m². A separate test of the thermal influx to the nitrogen radiation shield gives a result of 3 W/m.

It appears that the controlling mode of heat transfer is natural convection on the outside of the tube. In this example, the fluid velocity on the outside of the superconducting means in the return leg can be easily determined.

The temperature profile obtained was affected by the heat transfer rate and length. If the test section had operated as a better heat exchanger, it could be expected that the temperatures in FIG. 3 would be different, while reducing the temperature difference along the length of the test section. FIG. 3 shows that the return liquid-gas mixture 43 at the points along the transmission line in FIG. 2 was substantially the same as the go gas in the same figure.

The expansion engine normally operates with an 80% efficiency producing about 3.5° K of cooling with a given inlet temperature. When desired, the expander efficiency and refrigeration production are reduced by heating the gas at the expander inlet (e.g. by supplying 40.5 W of heat). This matches the refrigerator capacity to the load and controls the temperature profile.

In another test, the liquid and gas streams in the go and return directions were thermally separated in different enclosures, and the remote expander 53 was successfully employed therewith but with increased thermal heat flux and electrical loads. Moreover, the cool down was much smoother for the case where the counterstreaming liquid and gas streams were in thermal contact in the same enclosure. Additionally, temperature oscillation present in the thermally isolated streams in the go and return directions was immediately removed when the streams were in thermal contact in the same enclosure.

In one example, the cost of the described single enclosure 13 was typically $0.3 × 10⁶/km, which compared to a cost of $63 × 10⁶ over a 100 km for two parallel enclosures. Thus, the single enclosure of this invention, with thermal contact between the go and return streams, can do the same job as two enclosures with a potential saving of $31 × 10⁶. Additionally, a single enclosure with an internal vacuum barrier therebetween would be more complex and more costly than the described single enclosure with thermal contact between the go and return streams.

When operating with Nb or NbTi as a conductor at about 4.5 K the refrigerator ratios are reasonable. Refrigerator costs based on these ratios are low compared to enclosure costs. Thus, refrigeration efficiency is not the deciding factor in choosing a refrigerator process, and the refrigeration process that allows an overall reduction in the combined capital cost of the enclosure and refrigerators is advantageous. Not only is thermal isolation between the go and return streams not necessary when using Nb or NbTi as the superconductor, but thermal contact between the go and return streams allows a potentially large enclosure cost saving. Additionally, in accordance with this invention the temperature environment of a superconducting cable may be adjusted by varying the refrigerator process and heat transfer parameters. Still further, this invention is able to provide a cable temperature distribution that tends to be constant.

This invention has the advantage of providing thermally contacting, oppositely streaming, gas and liquid-gas streams at different pressures and like temperatures in the same enclosure for insulating the streams from the ambient in a closed cycle for maintaining a superconductor in the enclosure below its critical superconducting temperature. To this end, this invention has the advantage of providing a simple relatively inexpensive enclosure having a refrigerator and an expander at the opposite ends thereof, and a heat exchanger between the go and return lines at the refrigerator end of the line for providing a superconductor temperature that remains substantially constant from the refrigerator to the expander.

What is claimed is:

1. Cryogenic cooling apparatus for a consumer having a source of cryogenic cooling fluid under pressure for use with a longitudinally extending superconducting transmission line having an insulating enclosure with opposite terminals comprising:
   a. cryogenic cooling fluid;
   b. longitudinally extending superconductor transmission line means forming a first channel for circulating the cryogenic cooling fluid as a gas in a first stream at a first low temperature and a first high pressure in a first go direction;
   c. enclosure means encircling the transmission line means and forming a second channel in thermal contact with the first channel and the transmission line means for circulating the cryogenic cooling fluid as a boiling liquid-gas mixture at a second constant temperature and at a reduced, low, constant, second pressure in a second return direction opposite to said first go direction;
   d. first means for circulating the cryogenic fluid as a gas in the first channel at said first high pressure;
   e. second means for circulating the cryogenic cooling fluid as a liquid-gas mixture in the second channel at said second constant temperature and reduced, low constant second pressure to provide thermally contacting, oppositely streaming, cryogenic fluid streams in the same enclosure in a closed cycle at said different pressures, respectively, and
   f. means forming a heat exchanger between the counterstreaming streams in the go and return directions between the transmission line and the first means for maintaining the first and second temperatures nearly equal and at least as low as 4.5 K.

2. The apparatus of claim 1 in which the cryogenic cooling fluid is helium.

3. The apparatus of claim 2 in which the first means is a refrigerator means source of cryogenic cooling fluid in a pressurized gaseous state at a first pressure that communicates with the first channel for circulating the liquid in the first go direction.

4. The apparatus of claim 3 in which the second means is an expander means for receiving the gaseous cooling fluid, expanding the fluid to a boiling liquid-gas mixture, and transmitting the gas at the second pressure and temperature, which are lower than the first temperature and pressure to the refrigerator through the heat exchanger.

5. The apparatus of claim 4 in which the refrigerator and expander are arranged at opposite ends of the transmission line, so that the refrigerator compresses the gas, and the expander expands the gas in a closed cycle for endlessly circulating the cryogenic cooling fluid with a uniform temperature along the length of the transmission line that remains nearly constant in the first go direction due to the cooling effect of the boiling fluid on the gas, the boiling fluid circulating in the return direction and leaving the transmission line at nearly the same temperature as in the go direction.

6. The apparatus of claim 5 in which the channels contain high and low pressure fluid streams of He between about 4.2 and 4.8 K in said first go and second return directions.

7. The apparatus of claim 6 in which the transmission line contains a plurality of stabilized helically wound superconductors forming the first channel.

8. The apparatus of claim 7 having enclosure means containing a gas-liquid mixture in the second channel in a cross-sectional area that is larger than the cross-sectional area of the first channel for the liquid in the go direction.

9. A process for cooling a consumer, comprising a longitudinally extending superconducting transmission line for transmitting electrical power, comprising the steps of:
   a. forming an endless, longitudinally extending, closed circuit having cryogenic cooling fluid, thermally contacting, oppositely streaming, inner and outer, cryogenic fluid streams in go and return legs that are in thermal contact with each other and a superconducting transmission line while insulating the same from the ambient at a temperature $T_1$ to maintain the streams at temperatures between $T_3$ and $T_4$ in the go leg, $T_5$ and $T_6$ in the return leg, and below the critical temperature of the superconducting transmission line;
   b. refrigerating the fluid at one end of the line for feeding cryogenic cooling gas at high pressure and at a temperature $T_3$ for the go leg;
   c. expanding the liquid at the other end of the line for feeding a boiling liquid-gas mixture into the return leg at a reduced pressure and at a temperature $T_5$;
   d. circulating the cooled liquid-gas mixture back again to the refrigerator at a refrigerator inlet temperature of $T_7$;
   e. recompressing the low pressure gas into a high pressure gas in the refrigerator for endlessly circulating the fluid in the circuit; and
   f. exchanging heat between the counterstreaming streams in the go and return directions between the transmission line and refrigerated fluid to maintain the fluid streams at substantially equal temperatures within 1°–2° K, and to cool the coolant from the refrigerator at $T_2$ to a lower temperature $T_3$ as it enters the transmission line in the go direction where $T_1 > T_2 > T_4 > T_3 > T_5$ and $T_5 \approx T_6 \approx T_7$.

10. The method of claim 9 in which the high pressure gas directly contacts the transmission line, and the transmission line forms a gas tight partition separating the high pressure gas and the liquid-gas mixture in the same enclosure so that the liquid and gas maintain the transmission line below its critical superconducting temperature, and transmitting electrical power through the transmission line below its critical current.

* * * * *